United States Patent
Ko et al.

(10) Patent No.: US 11,150,644 B2
(45) Date of Patent: Oct. 19, 2021

(54) ROTATING SENSOR SUITE FOR AUTONOMOUS VEHICLES

(71) Applicant: GM Cruise Holdings LLC, San Francisco, CA (US)

(72) Inventors: Yung Change Ko, San Francisco, CA (US); Shane McGuire, San Franscisco, CA (US); Radu Raduta, San Francisco, CA (US); Brendan Hermalyn, San Francisco, CA (US); Joseph Robbins, San Francisco, CA (US); Mabel Lee, San Francisco, CA (US); Nate Herse, San Francisco, CA (US); Roger Lo, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 173 days.

(21) Appl. No.: 16/425,348

(22) Filed: May 29, 2019

(65) Prior Publication Data
US 2020/0379456 A1 Dec. 3, 2020

(51) Int. Cl.
*G05D 1/00* (2006.01)
*G01S 17/931* (2020.01)

(52) U.S. Cl.
CPC ......... *G05D 1/0022* (2013.01); *G05D 1/0044* (2013.01); *G01S 17/931* (2020.01)

(58) Field of Classification Search
CPC .. G05D 1/0022; G05D 1/0044; G01S 17/931; G01S 17/86; G01S 13/426; G01S 2013/93274; G01S 13/867; G01S 13/931
(Continued)

(56) References Cited

U.S. PATENT DOCUMENTS

2010/0263191 A1* 10/2010 Kllibarda ............... B62D 65/18
29/430
2017/0061813 A1 3/2017 Tao et al.
(Continued)

FOREIGN PATENT DOCUMENTS

DE 102018115399 A1 12/2018
EP 1225412 A1 7/2002

OTHER PUBLICATIONS

International Search Report and Written Opinion for International Application No. PCT/US2019/068308, dated May 15, 2020, 12 pages.

*Primary Examiner* — Muhammad Shafi
(74) *Attorney, Agent, or Firm* — Polsinelli, PC

(57) ABSTRACT

Technologies for steering sensors in a payload carrier structure on an autonomous vehicle (AV) are described herein. An example method can include receiving, by a motor control system on the AV, instructions for controlling a motor on the motor control system to reposition the payload carrier structure from a first position to a second position; based on the instructions, sending, by a controller on the motor control system to a motor driver on the motor control system, a command instructing the motor driver to reposition the payload carrier structure from the first position to the second position; sending, by the motor driver to the motor, a control signal generated by the motor driver based on the command, the control signal controlling the motor to reposition the payload carrier structure to the second position; and moving, by the motor, the payload carrier structure and sensors to the second position.

20 Claims, 7 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2019/0317497 A1* | 10/2019 | Mere ...................... | G05D 1/028 |
| 2019/0384313 A1* | 12/2019 | Toth ..................... | H04N 5/2252 |

* cited by examiner

ROTATING SENSOR SUITE FOR AUTONOMOUS VEHICLES

TECHNICAL FIELD

The present disclosure generally relates to sensor implementations for autonomous vehicles.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

The field of view and coverage of sensors can depend on their capabilities and placement (e.g., location, angle, etc.). In the context of autonomous vehicles, the field of view and coverage of sensors can also be significantly impacted by changes in motion, driving angles and direction, as well as changes in their environment, including relative changes in the motion, angle, and position of surrounding objects. For example, as an autonomous vehicle travels and performs various driving maneuvers, the position and perspective of the sensors relative to the vehicle's surroundings also change. The changes in the relative position and perspective of the sensors can create blind spots and reduce their field of coverage, thereby limiting what the sensors can "see" or detect. However, autonomous vehicles need to have a robust understanding of their environment to safely operate, and because they largely rely on sensors to navigate and understand their environment, a sensor blind spot or reduced field of coverage can create significant risks to human lives and property.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements in vehicle sensor technologies and capabilities. In some examples, a sensor positioning platform on an autonomous vehicle can include multiple co-located sensors that can be rotated or repositioned as needed for optimal sensor coverage. The sensors can be mounted on a rotating payload carrier structure of the sensor positioning platform, which functions as an azimuth positioning stage for the sensors. The sensor positioning platform can include a motor for moving, repositioning, and/or rotating the sensors and payload carrier structure, and electrical components for controlling the movement, repositioning, and/or rotation of the sensors and payload carrier structure through the motor. The sensor positioning platform can receive commands from a remote computing system for moving, repositioning, and/or rotating the sensors and payload carrier structure.

Through the sensor positioning platform, the sensors can be repositioned to increase sensor coverage, provide instantaneous field of view, and target specific areas or objects. The sensors can also be repositioned to account for changes in the vehicle's motion, driving angles and direction, as well as relative changes in the vehicle's environment and the motion, angle, and position of surrounding objects. The dynamic and adaptable sensor repositioning herein can improve the sensors' visibility, accuracy, and detection capabilities. The sensor repositioning platform can allow autonomous vehicles to monitor their surroundings and obtain a robust understanding of their environment. Moreover, the sensor repositioning platform and associated functionality can provide significant benefits in cost, sensor data redundancy, and sensor fusion.

Figure 1:
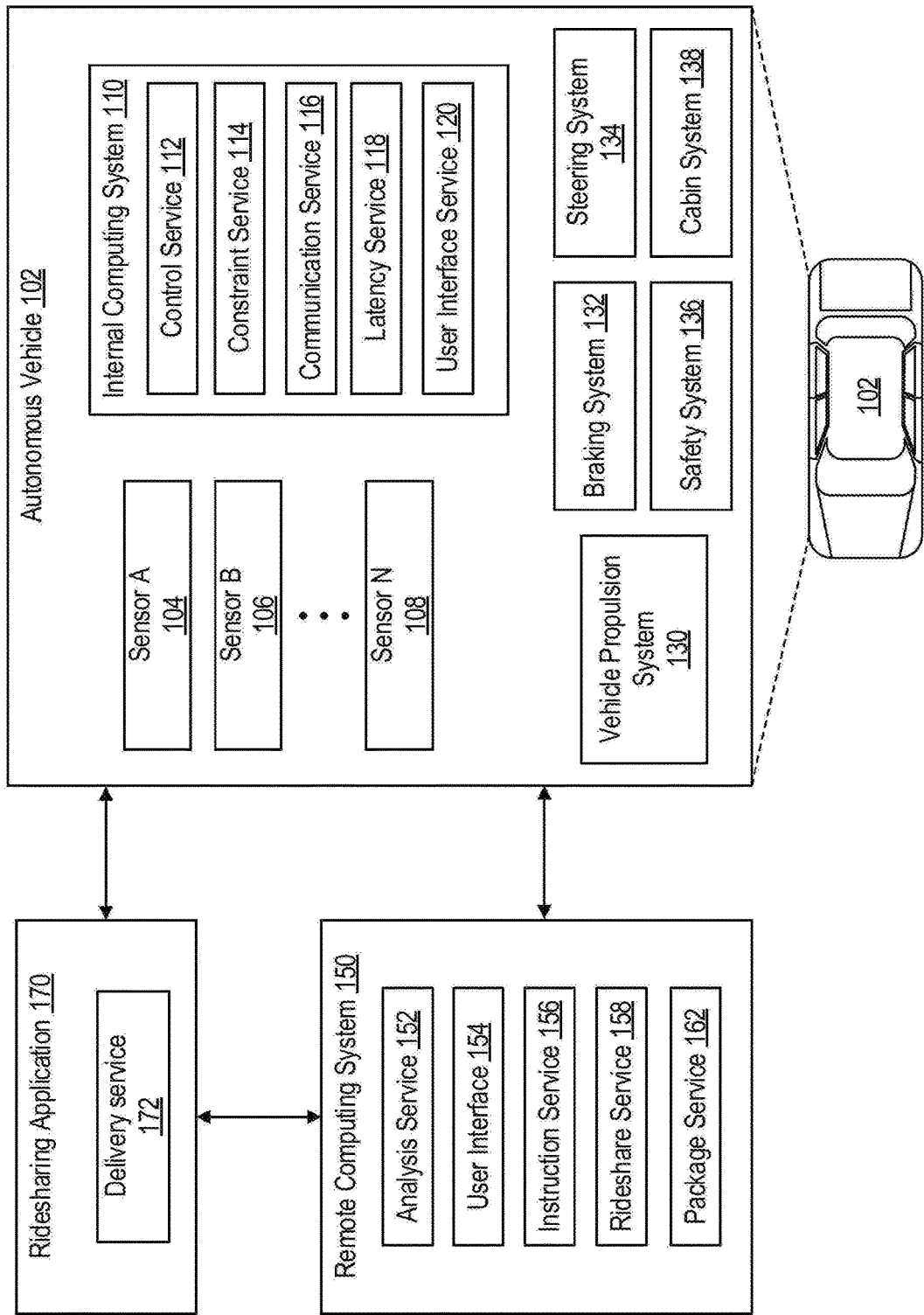
FIG. 1 illustrates an example autonomous vehicle environment including a computing system in communication with an autonomous vehicle.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, etc.), one or more light emitting sensors (e.g., one or more lasers, one or more light detection and ranging sensors (LIDARs), etc.), one or more global positioning system (GPS) devices, one or more radars, one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., an infrared camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 206, the braking system 208, the steering system 210, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), $3^{rd}$ Generation (3G), $5^{th}$ Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
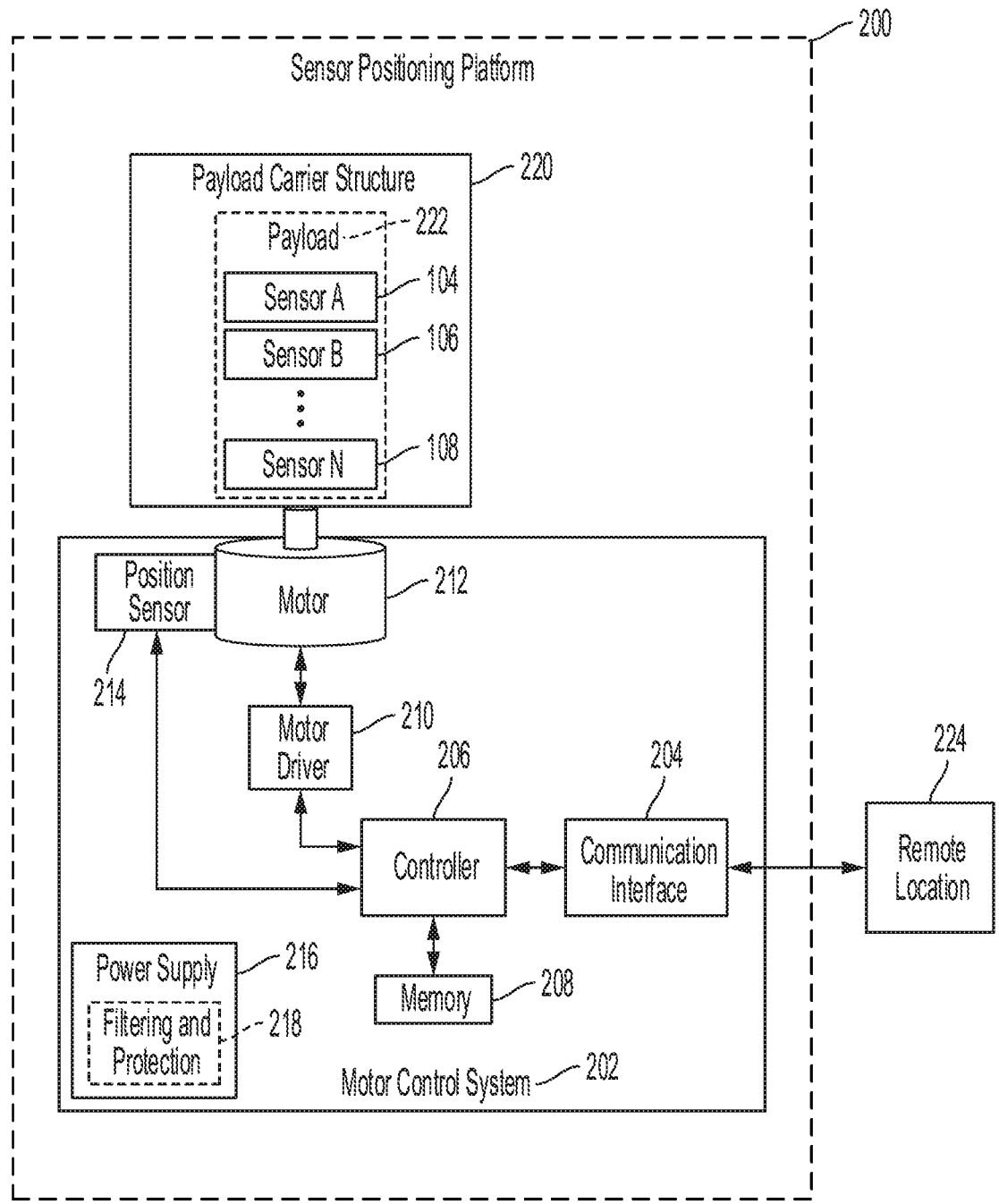
FIG. 2 is a block diagram of an example sensor positioning platform for mechanically moving, rotating, and/or positioning a payload of sensors on an autonomous vehicle.

FIG. 2 is a block diagram of an example sensor positioning platform 200 for mechanically moving, rotating, and/or positioning a payload 222 of sensors 104-108 implemented by the autonomous vehicle 102. The sensor positioning platform 200 can be attached to, coupled with, and/or otherwise secured to the autonomous vehicle 102. The payload 222 and/or the sensors 104-108 on the payload 222 can be situated outside of the autonomous vehicle 102 in order to have access to, and/or visibility into, the external or outside environment (e.g., outside or external to the autonomous vehicle 102) so the sensors 104-108 can capture sensor data or measurements pertaining to the outside environment, conditions or characteristics of the outside environment, objects or humans located in the outside environment, etc.

In addition to providing the sensors 104-108 access to, and/or visibility into, the external or outside environment, as further described herein, the sensor positioning platform 200 can mechanically move, rotate, and/or reposition the payload 222 of sensors 104-108 to allow the sensors 104-108 to capture sensor data or measurements for different areas or regions of the outside environment, extend the addressable field of regard, extend and/or provide an instantaneous field of view, provide sensor visibility or access into a focused or specific area or object, account for different angles, account for different vehicle maneuvers, etc. The sensor data or measurements can be used to detect objects (e.g., other vehicles, obstacles, traffic signals, signs, etc.), humans, animals, conditions (e.g., weather conditions, visibility conditions, traffic conditions, road conditions, etc.), route or navigation conditions, and/or any other data or characteristics associated with the outside environment.

In some examples, the autonomous vehicle 102 can use the sensor data or measurements to perform (or when performing) one or more operations, such as mapping operations, tracking operations, navigation or steering operations, safety operations, braking operations, etc. To illustrate, the autonomous vehicle 102 can use the sensor data or measurements to gain insight or visibility into the outside environment and the outside environment conditions. The autonomous vehicle 102 can then use such insight when making navigation decisions, such as determining a velocity, determining a maneuver, determining how to avoid an object, determining a trajectory, determining navigation changes (e.g., changes in position, velocity, angle, direction, etc.), and so forth.

The sensor positioning platform 200 can include a motor control system 202 for controlling a position, angle, and/or movement of the payload 222 of sensors 104-108. The motor control system 202 can include a communication interface 204 for sending and/or receiving data to and from a remote location 224, such as the autonomous vehicle 102, the remote computing system 150, a switch or router, a remote server, a network (e.g., a local and/or remote network), the Internet, a cloud, a remote service, etc.

For example, the motor control system 202 can use the communication interface 204 to receive commands from the remote location 224 (e.g., a cloud, a server, autonomous vehicle 102, remote computing system 150, etc.) with instructions on how or where to position, rotate, and/or move the payload 222 of sensors 104-108 and/or a motor 212 on the motor control system 202 for controlling the positioning, rotation, and/or movement of the payload 222 of sensors 104-108 as further described herein. To illustrate, the motor control system 202 can receive, through the communication interface 204, a command from a server or cloud instructing the motor control system 202 to move or rotate the payload 222 of sensors 104-108 (e.g., via the motor 212) to a specific angle and/or position.

In some implementations, the communication interface 204 can support wireless communications, such as cellular, WIFI communications, etc. In other implementations, the communication interface 204 can support wired or cable communications, such as Ethernet communications, fiber optic communications, etc. For example, in some cases, the communication interface 204 can be an Ethernet networking interface for Ethernet communications. The Ethernet networking interface can connect to, for example, a separate Ethernet device or interface, such as an Ethernet switch for connecting the Ethernet networking interface with a remote location (224), such as a computing device, a network (e.g., a remote and/or local network), a router, the autonomous vehicle 102, the remote computing system 150, a cloud site, the Internet, a server, etc.

The communication interface 204 can be in communication with a controller 206 on the motor control system 202 to send and receive data (e.g., instructions, commands, signals, content, etc.) to and from the controller 206. For example, the communication interface 204 can transmit to the controller 206 data received from remote location 224, such as sensor or motor repositioning data. As another example, the communication interface 204 can transmit to remote location 224 data received from the controller 206, such as data or measurements from the sensors 104-108.

The controller 206 can include one or more electronic circuits (e.g., one or more microprocessors, graphics processing units (GPUs), microcontrollers, digital signal processors (DSPs), central processing units (CPUs), and/or any other suitable electronic circuits), and/or can include and/or can be implemented using computer software, firmware, or any combination thereof, to perform the various operations described herein. In some examples, the controller 206 can be a microcontroller. The microcontroller can include one or more computing components, such as one or more CPUs, Input/Output (I/O) ports or peripherals, timers, memories (e.g., electrically erasable programmable read-only memory (EEPROM), read-only memory (ROM), random-access memory, and the like), and/or any other electronic circuits or hardware. In the example shown in FIG. 2, the controller 206 includes memory 208, such as EEPROM, for storing data, firmware, software, and/or any combination thereof.

As previously mentioned, the communication interface 204 can receive commands or instructions for mechanically moving, rotating, and/or positioning the payload 222 of sensors 104-108 and/or motor 212 on the sensor positioning platform 200. The communication interface 204 can communicate such commands or instructions to the controller 206, which can then parse the commands or instructions, generate one or more control signals based on the commands or instructions, and send the one or more control signals to a motor driver 210 on the motor control system 202, which can use (the motor driver 210) the one or more control signals to move the motor 212 (and the payload 222 of sensors 104-108) to a specified position, angle, and/or location.

In some cases, when generating the one or more control signals, the controller 206 can calculate a difference between a requested position (e.g., specified in the commands or instructions received by the communication interface 204) of the motor 212 (and the payload 222 of sensors 104-108) and an actual or current position of the motor 212 (and the payload 222 of sensors 104-108). For example, the controller 206 can obtain sensor data from a position sensor 214 in the motor control system 202, which can include measurements of a current or actual position of the motor 212, and use such measurements to determine a current or actual position of the motor 212. The controller 206 can use the current or actual position of the motor 212 to calculate an error between the current or actual position of the motor 212 and the requested position for repositioning the motor 212 (and the payload 222 of sensors 104-108).

The controller 206 can then use the calculated error to make any adjustments to the position defined in the one or more control signals to the motor driver 210. In some cases, the controller 206 can continuously receive position measurements from the position sensor 214 to calculate such errors and make adjustments to the position specified in the control signals to the motor driver 210. This way, the controller 206 can fine tune the position specified in the control signals to the motor driver 210 to account for any such errors and increase an accuracy of the position adjustments of the motor 212 (and the payload 222 of sensors 104-108).

The position sensor 214 used to obtain position measurements for the motor 212 can include one or more sensor devices, which can include any type of sensor, encoder, transducer, detector, transmitter, and/or sensing component capable of measuring the position (e.g., linear, angular, etc.) and/or change of position of a target or object, such as the motor 212. Non-limiting examples of position sensors (214) that can be used to obtain position measurements (e.g., displacement, linear position, angular position, etc.) for the motor 212 include optical encoders, potentiometers, magnetic position sensors (e.g., Hall effect sensors, magnetorestrictive position sensors, etc.), rotary encoders, linear encoders, capacitive position sensors, inductive position sensors (e.g., resolvers, linearly variable differential transformers, etc.), fiber-optic position sensors, photodiode arrays, incoders, etc. These examples are not exhaustive and are instead provided for explanation purposes, as other types of position sensors are also contemplated herein.

Moreover, the position sensor 214 can reside under the motor 212, along an outside of the motor 212, along an outside of a rotor of the motor 212, along an outside of a stator of the motor 212, and/or in any other location that allows the position sensor 214 to obtain positioning measurements for the motor 212 and fit within an assembly of the motor control system 202. For example, in some implementations, the position sensor 214 can determine the position of the motor 212 using a multi-pole magnetic strip. The multi-pole magnetic strip can be located on an outside of the motor 212, a rotor of the motor 212, a stator of the motor 212, and/or any other location that allows the multi-pole magnetic strip to accurately determine the position of the motor 212. In some examples, the multi-pole magnetic strip can sit flush along the outside of the rotor of the motor 212.

After receiving the one or more control signals from the controller 206, the motor driver 210 can translate the one or more control signals into a format and power level that can move the motor 212 to a specific position. The specific position can be defined in the one or more control signals as previously explained. The motor driver 210 can then transmit the translated signal to the motor 212 in order to move the motor 212 to the specific position. Based on the translated signal from the motor driver 210, the motor 212 can move a payload carrier structure 220 containing the payload 222 of sensors 104-108 in order to move or reposition the sensors 104-108 to the specific position. The motor 212 can be an electrical motor capable of converting electrical energy into mechanical energy that the motor 212 can use to move the payload carrier structure 220 and/or the payload 222 of sensors 104-108. In some implementations, the motor 212 can be a gimbal motor.

The payload 222 of sensors 104-108 can be attached, coupled, fixed, or otherwise secured to the payload carrier structure 220. For example, the sensors 104-108 can be co-located on the payload carrier structure 220. Thus, by moving or repositioning the payload carrier structure 220, the motor 212 can also move or reposition the payload 222 of sensors 104-108. Moreover, by affixing and/or co-locating the sensors 104-108 on the payload carrier structure 220, any need to calibrate the sensors 104-108 or monitor their relative position can be reduced or eliminated, as the position (actual and relative) of the sensors 104-108 can be fixed and known.

The payload carrier structure 220 can be, for example and without limitation, an articulating or positioning stage, frame, or platform for the sensors 104-108. For example, the payload carrier structure 220 can be an azimuth positioning stage for the sensors 104-108. Moreover, the payload carrier structure 220 can be attached, coupled, fixed or otherwise secured to the motor control system 202.

In some cases, the motor control system 202 and/or the payload carrier structure 220 can be attached, coupled, fixed, placed, or otherwise secured to an external portion of the autonomous vehicle 102 to provide the sensors 104-108 access to, and/or visibility into, the outside or external environment. For example, the motor control system 202 and/or the payload carrier structure 220 can be securely placed on a pillar, such as the A-pillar, of the autonomous vehicle 102. In this example, the motor control system 202 and/or the payload carrier structure 202 can reside on an outside of the autonomous vehicle 102 between the windshield, the hood of the autonomous vehicle 102, and the passenger or driver's side. Thus, the sensors 104-108 can reside outside of the autonomous vehicle 102 and have access to, and/or visibility into, the outside or external environment.

In other cases, a portion of the motor control system 202 and/or the payload carrier structure 220 can be attached, coupled, fixed, placed, or otherwise secured to an internal portion of the autonomous vehicle 102, with another portion of the motor control system 202 and/or the payload carrier structure 220 extending, extruding, protruding, projecting and/or sticking out from the autonomous vehicle 102 to an outside of the autonomous vehicle 102. Thus, the sensors 104-108 can reside outside of the autonomous vehicle 102 and thus have access to, and/or visibility into, the outside or external environment.

The motor 212 can move the payload carrier structure 220 and/or the payload 222 of sensors 104-108 any number of times as previously described, in order to adjust the position or angle of the sensors 104-108 as desired and thus the visibility and/or coverage of the sensors 104-108. For example, the motor 212 can move the payload carrier structure 220 and/or the payload 222 of sensors 104-108 as requested, periodically (e.g., at specific or random time intervals), randomly, and/or in response to one or more events, such as a maneuver of the autonomous vehicle 102, a change in position or motion of the autonomous vehicle 102, a detected human or object (e.g., another vehicle, a traffic sign, an object on the road, a guardrail, etc.), a detected condition (e.g., a condition of the autonomous vehicle 102, a condition of the external environment, a traffic condition, a road condition, a safety condition or threat, etc.), a navigation instruction, a predicted navigation event, etc.

The motor control system 202 and/or sensor positioning platform 200 can also include a power supply 216 for powering the various electronic components of the sensor positioning platform 200, such as the communication interface 204, the controller 206, the memory 208, the motor driver 210, the motor 212, the position sensor 214, the sensors 104-108, and/or any other electronic component. In some cases, the power supply 216 can also include or implement a power supply filtering and protection element 218.

In some implementations, the motor control system 202 can include or can be housed in an assembly. The assembly can contain and/or protect the various components of the motor control system 202. In some examples, the assembly can have a small and/or cylindrical form factor. In other examples, the assembly can have any other size, shape or design. Moreover, the assembly can have one or more hollow sections, such as a hollow shaft, for cables to pass through (e.g., from the bottom and through the middle of the assembly) the assembly to the top of the assembly and/or to the sensors 104-108 on the payload carrier structure 220.

Further, in some cases, one or more of the electronic components or hardware inside of the assembly (e.g., the communication interface 204, the controller 206, the memory 208, the motor driver 210, the position sensor 214, etc.) can be included in, or implemented by, a printed circuit board (PCB). In some implementations, such PCB can be placed or located under the motor 212.

While the sensor positioning platform 200 and the motor control system 202 are shown in FIG. 2 to include certain components, one of ordinary skill will appreciate that the sensor positioning platform 200 and/or the motor control system 202 can include more or fewer components than those shown in FIG. 2. For example, in some instances, the sensor positioning platform 200 and/or the motor control system 202 can include one or more different or additional components such as one or more memory components (e.g., one or more RAMs, ROMs, caches, buffers, and/or the like), one or more processing devices that are not shown in FIG. 2, one or more auxiliary control transistors, one or more storage devices (e.g., one or more hard drives, one or more solid-state drives, and/or the like), one or more circuits that are not shown in FIG. 2, one or more sensors that are not shown in FIG. 2, and/or any other electronic or mechanical component.

Figure 3:
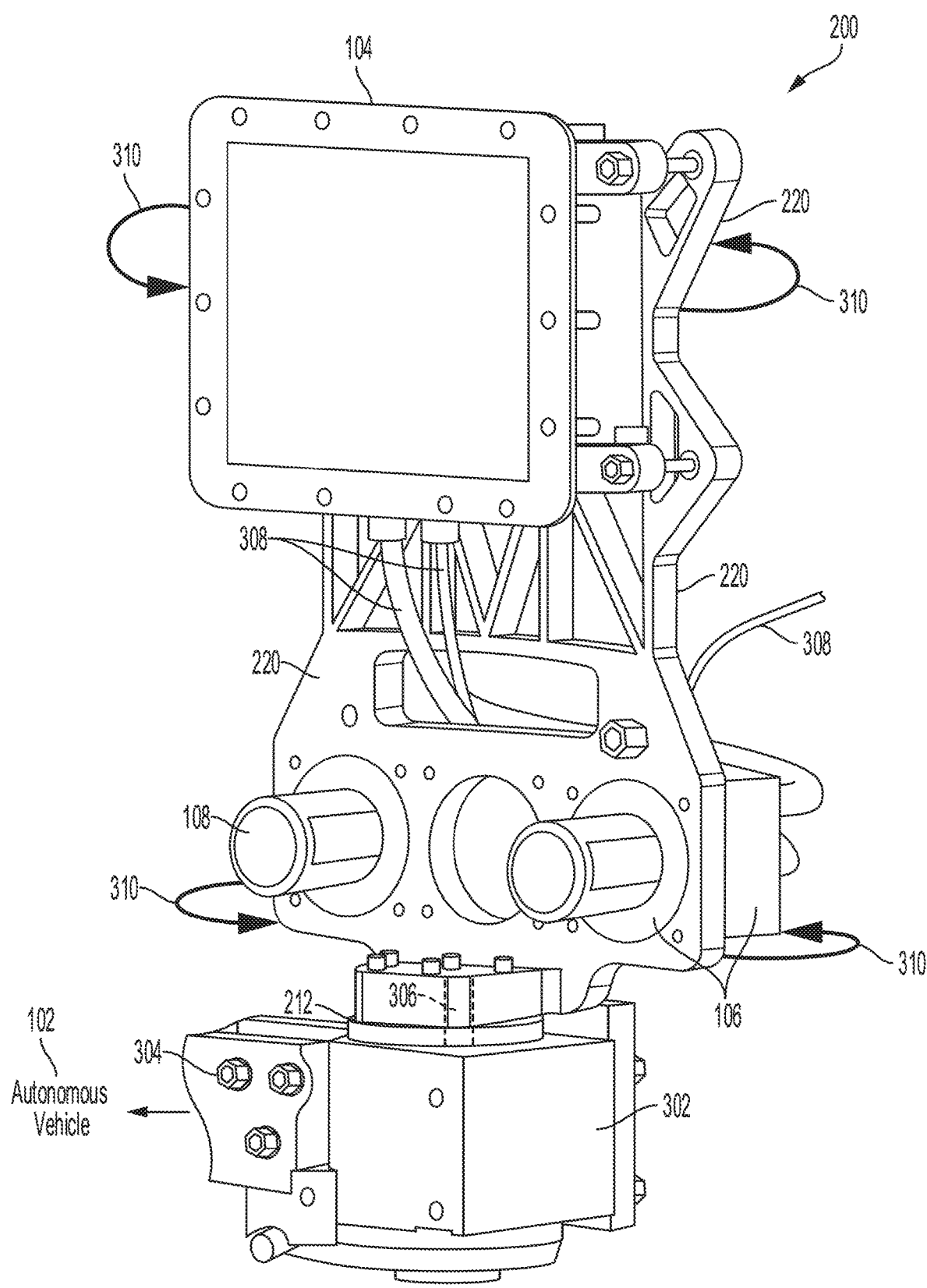
FIG. 3 illustrates an example sensor positioning platform.

FIG. 3 illustrates an example sensor positioning platform 200. In this example, the sensor positioning platform 200 includes the payload carrier structure 220, which includes or contains the sensors 104-108, and an assembly 302 that houses the motor control system 202. The assembly 302 can include a securing element 304 for securing, attaching, coupling, or affixing the sensor positioning platform 200 to the autonomous vehicle 102. In some examples, the securing element 304 can be a rotating or articulating element or member that can rotate, pivot, or reposition the assembly 302 (and thus the payload carrier structure 220 and sensors 104-108 as further described below) along an axis of rotation or motion such as a roll axis (e.g., Z axis).

A portion, element or joint of the motor 212 on the motor control system 202 in the assembly 302 can be attached, connected or coupled to the payload carrier structure 220 to allow the motor 212 to control the position, angle, orientation, and/or movement of the payload carrier structure 220. For example, in some cases, a top portion of the motor 212 can interface with the payload carrier structure 220 to enable the motor 212 to move and control the position, angle, orientation and/or movement of the payload carrier structure 220 and the sensors 104-108 on the payload carrier structure 220.

In some examples, the motor 212 or a portion of the motor 212 can extend from the assembly 302 to interface or connect to the payload carrier structure 220. In other examples, the assembly 302 can have an opening that allows the payload carrier structure 220 and the motor 212 or a portion of the motor 212 to make contact and/or be secured, coupled, connected, and/or attached to each other. Moreover, in some implementations, the payload carrier structure 220 and the motor 212 can be connected, secured, attached, and/or coupled through, from, or at a top portion of the assembly 302. However, in other implementations, the payload carrier structure 220 and the motor 212 can be connected, secured, attached, and/or coupled through, from, or at any other portion or location of the assembly 302.

The motor 212 can exert force on the payload carrier structure 220 in order to adjust or control the position, angle, orientation, and/or movement of the payload carrier structure 220 as previously explained. For example, the motor 212 can exert force on the payload carrier structure 220 to rotate 310 the payload carrier structure 220 to a requested or specified position or angle. As the payload carrier structure 220 rotates 310, the sensors 104-108 can also rotate 310 with the payload carrier structure 220. Thus, such rotation of the payload carrier structure 220 can reposition the sensors 104-108 and adjust the orientation, position, field of view and/or coverage of the sensors 104-108.

Moreover, as previously explained, the payload carrier structure 220 can include the sensors 104-108. The sensors 104-108 can be affixed, coupled, secured, connected, and/or attached to the payload carrier structure 220 such that the sensors 104-108 can move with the payload carrier structure 220 when the payload carrier structure 220 is rotated, repositioned, or otherwise moved by the motor 212. The payload carrier structure 220 can thus serve as a positioning stage or platform for the sensors 104-108. For example, in some cases, the payload carrier structure 220 can serve as an azimuth positioning stage for the sensors 104-108. Moreover, in some examples, the sensors 104-108 can be fixed or statically secured to the payload carrier structure 220 such that the sensors 104-108 maintain the same (or substantially the same) location, position, angle, view, etc., relative to each other and the payload carrier structure 220.

In some cases, the payload carrier structure 220 can rotate 310 along a horizontal or yaw axis (e.g., X axis) and thus can provide the sensors 104-108 rotational movement along the horizontal or yaw axis. In other cases, the payload carrier structure 220 can rotate along various axes and thus provide the sensors 104-108 multiple degrees of freedom. For example, in some cases, the payload carrier structure 220 can rotate along a horizontal or yaw axis (e.g., X axis) and a vertical or pitch axis (e.g., Y axis) and thereby provide the sensors 104-108 rotational movement along the horizontal or yaw axis as well as the vertical or pitch axis. In some cases, the payload carrier structure 220 can also extend up or down or otherwise move the sensors 104-108 up or down to adjust the altitude or height of the sensors 104-108.

The assembly 302 can include hollow space to run cables 308, such as power cables and data cables (e.g., Ethernet cable, fiber optic cable, etc.), through the assembly 302 and to the sensors 104-108 so the cables 308 can be connected to the sensors 104-108 on the payload carrier structure 220. For example, the assembly 302 can include a hollow shaft 306 that allows cables 308 to pass through the assembly 302 to the sensors 104-108 on the payload carrier structure 220. In some cases, the payload carrier structure 220 can also include free spaces, openings, and/or hollow areas to allow cables 308 to run through and/or about the payload carrier structure 220 and connect to the sensors 104-108.

In the example shown in FIG. 3, the payload carrier structure 220 includes a radar sensor 104, and two co-located image sensors 104-106, such as a visible light image sensor and an IR image sensor. However, it should be noted that this configuration is provided as a non-limiting example for explanation purposes, and other configurations are also contemplated herein. For example, in other configurations, the payload carrier structure 220 can include more or less sensors than those shown in FIG. 3, one or more different types of sensors than those shown in FIG. 3, one or more of the same type of sensors as those shown in FIG. 3, and/or a different combination or placement of sensors than that shown in FIG. 3. To illustrate, in some examples, the payload carrier structure 220 can include one or more image sensors (e.g., a visible light camera, an IR camera, etc.), one or more radars, and/or one or more other types of sensors such as LIDARs, IMUs, etc.

Figure 4:
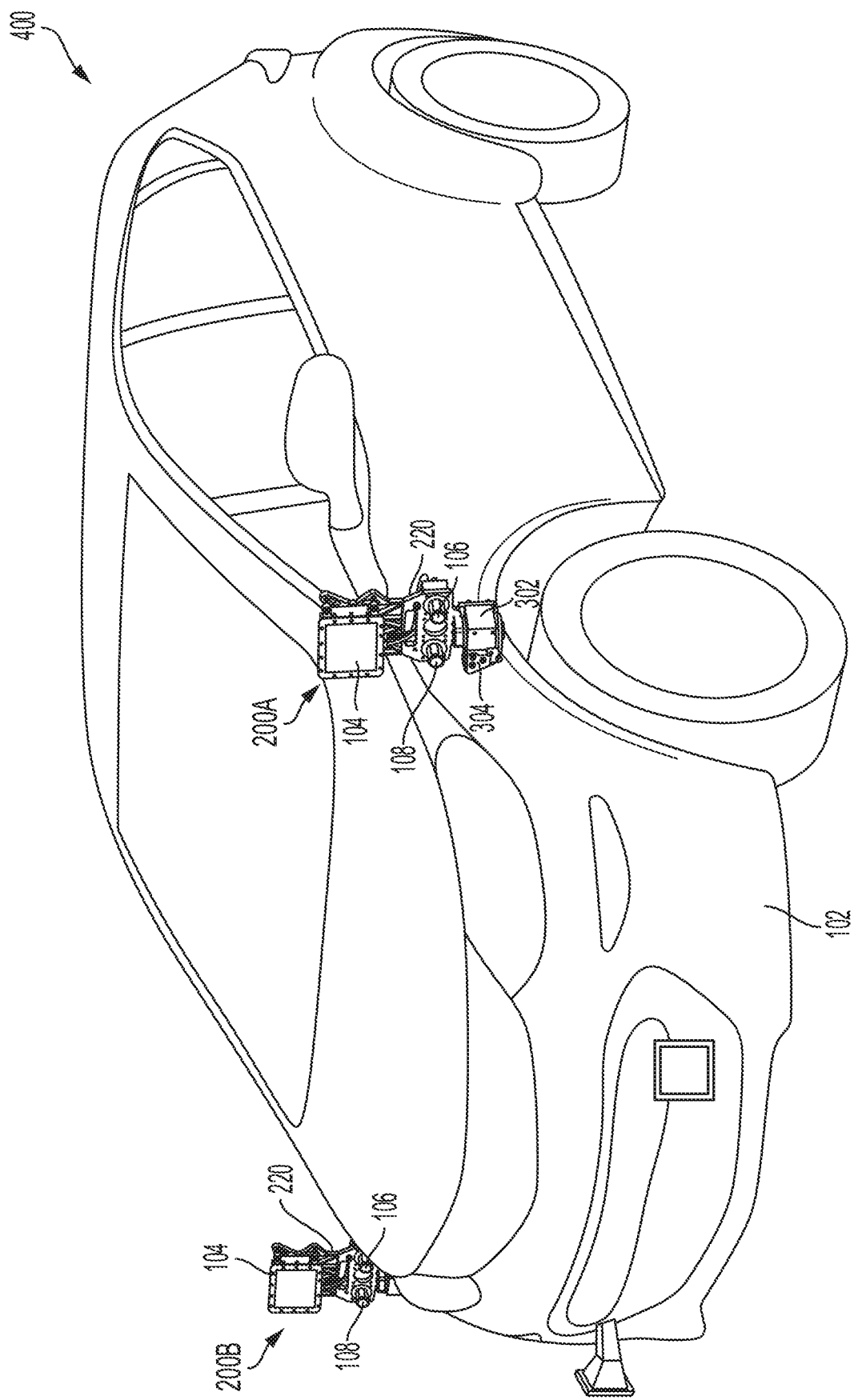
FIG. 4 illustrates an example configuration of an autonomous vehicle having a sensor positioning platform on each side of the autonomous vehicle.

FIG. 4 is a view 400 of an example autonomous vehicle 102 with a sensor positioning platform as shown in FIG. 3 on each side of the autonomous vehicle 102. As illustrated in view 400, the autonomous vehicle 102 includes a first sensor positioning platform 200A on the driver's side of the autonomous vehicle 102 and a second sensor positioning platform 200B on the passenger's side of the autonomous vehicle 102. The sensor positioning platforms 200A-B can include respective payload carrier structures 220 containing sensors 104-108, a respective assembly 302 housing a respective motor control system (e.g., 202), and a respective securing element 304 for securing the sensor positioning platforms 200A-B to the autonomous vehicle 102.

Through the sensor positioning platforms 200A-B, the sensors 104-108 on the respective payload carrier structures 220 can have access and visibility to the outside or external environment, allowing the sensors 104-108 to collect sensor data and measurements (e.g., images, videos, radar sensor data, laser sensor data, structured light data, etc.) of the outside or external environment. The payload carrier structure 220 on the sensor positioning platforms 200A-B can be moved, positioned, rotated, oriented, etc., as previously explained, to allow the sensors 104-108 to collect sensor data and measurements from different positions, angles, locations, perspectives, field of views or coverage, etc. In some cases, the sensors 104-108 can continuously or periodically collect sensor data and measurements from a current position, an adjusted position, and/or as the sensors 104-108 are repositioned (e.g., rotated, oriented, etc.).

The ability to reposition the sensors 104-108 and obtain sensor data and measurements from different dimensions of space and time can allow the sensors 104-108 to collect sensor data and measurements from a wide variety of perspectives, and can increase the addressable field of regard of the sensors 104-108, vary the instantaneous field of view of the sensors 104-108, allow an increase and/or reduction of an allowable tracking error, etc. Moreover, the autonomous vehicle 102 can use the sensor data and measurements from the sensors 104-108 for one or more operations such as, for example, detection operations (e.g. detecting fixed and/or moving objects, animals, humans, etc.; detecting environment conditions; detecting scenes or views; etc.), tracking operations, localization operations, mapping operations, planning operations, safety operations, navigation operations, and so forth.

Figure 5:
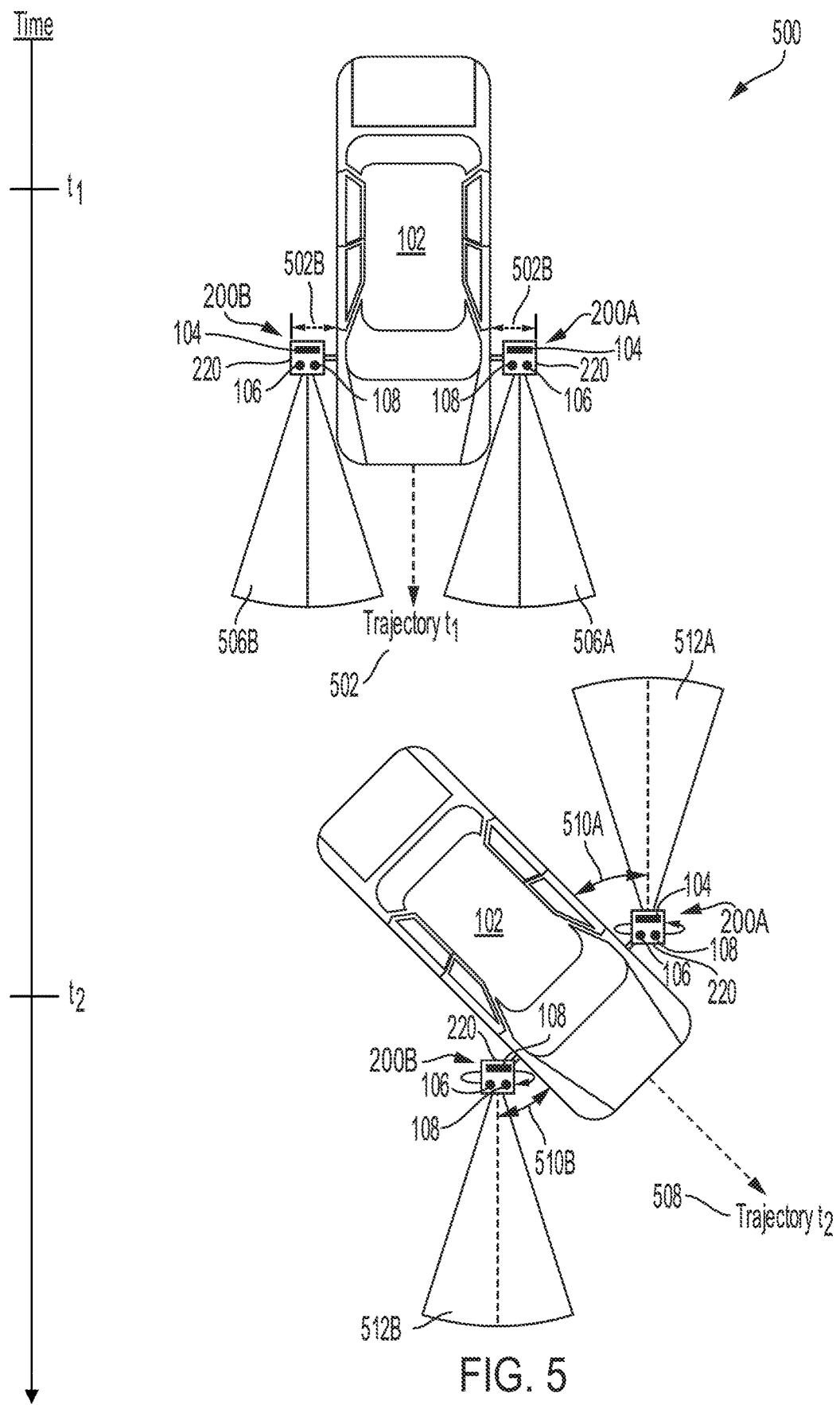
FIG. 5 illustrates an example use of sensor positioning platforms on an autonomous vehicle.

FIG. 5 illustrates an example use 500 of sensor positioning platforms 200A-B on an autonomous vehicle 102. In this example, the autonomous vehicle 102 is traveling in a linear trajectory 502 at time $t_i$. The autonomous vehicle 102 includes a sensor positioning platform 200A on the driver side and a sensor positioning platform 200B on the passenger side. The payload carrier structures 220 on the sensor positioning platforms 200A-B include sensors 104-108 which are actively or continuously collecting sensor data and measurements from their respective positions or perspectives as the autonomous vehicle 102 travels along the trajectory 502.

At $t_1$, the payload carrier structure 220 on the sensor positioning platform 200A is positioned at a first rotation angle 502A, or yaw angle, relative to the autonomous vehicle 102 (and/or the trajectory 502 of the autonomous vehicle 102), and the payload carrier structure 220 on the sensor positioning platform 200B is positioned at a second rotation angle 502B relative to the autonomous vehicle 102 (and/or the trajectory 502 of the autonomous vehicle 102). The first rotation angle 502A and the second rotation angle 502B can be the same or different.

Given the first rotation angle 502A associated with the payload carrier structure 220 on the sensor positioning platform 200A, the sensors 104-108 on that payload carrier structure 220 have a specific field of view 506A at $t_1$, which is at least partly based on the first rotation angle 502A of the payload carrier structure 220 on which those sensors 104-108 reside. Similarly, given the second rotation angle 502B associated with the payload carrier structure 220 on the sensor positioning platform 200B, the sensors 104-108 on that payload carrier structure 220 have a specific field of view 506B at $t_1$, which is at least partly based on the second rotation angle 502B of the payload carrier structure 220 on which those sensors 104-108 reside.

As shown in FIG. 5, at $t_2$, the autonomous vehicle 102 is making a turn and has consequently changed its direction of travel to a different trajectory 508. As (or before) the autonomous vehicle 102 turns and travels in the different trajectory 508, the payload carrier structures 220 on the sensor positioning platforms 200A-B can be repositioned to different rotational angles 510A-B. The payload carrier structures 220 can be repositioned by the respective motors 212 on the sensor positioning platforms 200A-B as previously explained. Moreover, the payload carrier structures 220 can be repositioned to adjust the position of the sensors 104-108 on the sensor positioning platforms 200A-B in order to achieve different fields of view 512A-B, which can be based at least partly on the different rotational angles 510A-B, and obtain sensor data for different areas of interest at least partly within the different fields of view 512A-B.

In one illustrative example, the different areas of interest can include an area along the different trajectory 508 which the autonomous vehicle 102 is crossing or plans to cross, and an area that the autonomous vehicle 102 needs to check for objects (e.g., oncoming/incoming vehicles, pedestrians, etc.) before or while the autonomous vehicle 102 travels in or towards the different trajectory 508 (e.g., before or while the autonomous vehicle 102 crosses a lane, makes a turn, makes a maneuver, changes direction, etc.). Other non-limiting examples of areas of interest that can be targeted through the repositioning of the payload carrier structures 220 can include an area where a certain object or condition is located that the autonomous vehicle 102 is tracking, a blind spot, an area for which the autonomous vehicle 102 wants to collect more sensor data (e.g., to gain greater insight or visibility into the area and/or the surrounding environment, to confirm that no safety hazards or approaching objects exist, etc.), an area for which the autonomous vehicle 102 wants to get new or additional sensor data, and/or any other area that may be of interest to the autonomous vehicle 102 for any reason (e.g., safety, navigation, visibility, localization, mapping, etc.).

In some cases, the repositioning of the payload carrier structures 220 at $t_2$ (and/or the different rotational angles 510A-B) can be calculated and/or performed in response to, or in anticipation of, the different trajectory 508 and/or a change (actual and/or predicted) in direction or trajectory of the autonomous vehicle 102 between $t_1$ and $t_2$. For example, the different rotational angles 510A-B can be selected and/or calculated to account for the different trajectory 508, a change in the relative position or motion of the autonomous vehicle 102 and other objects due to the different trajectory 508, a change in the surrounding environment and/or circumstances of the autonomous vehicle 102 due to the different trajectory 508, a gap in visibility and/or current data due to the different trajectory 508, a need to gain additional perspectives due to the different trajectory 508, a need to supplement the data or estimates for one or more areas due to the different trajectory 508, and/or any other reason or condition prompted by the autonomous vehicle 102 changing its direction of travel to the different trajectory 508.

Figure 6:
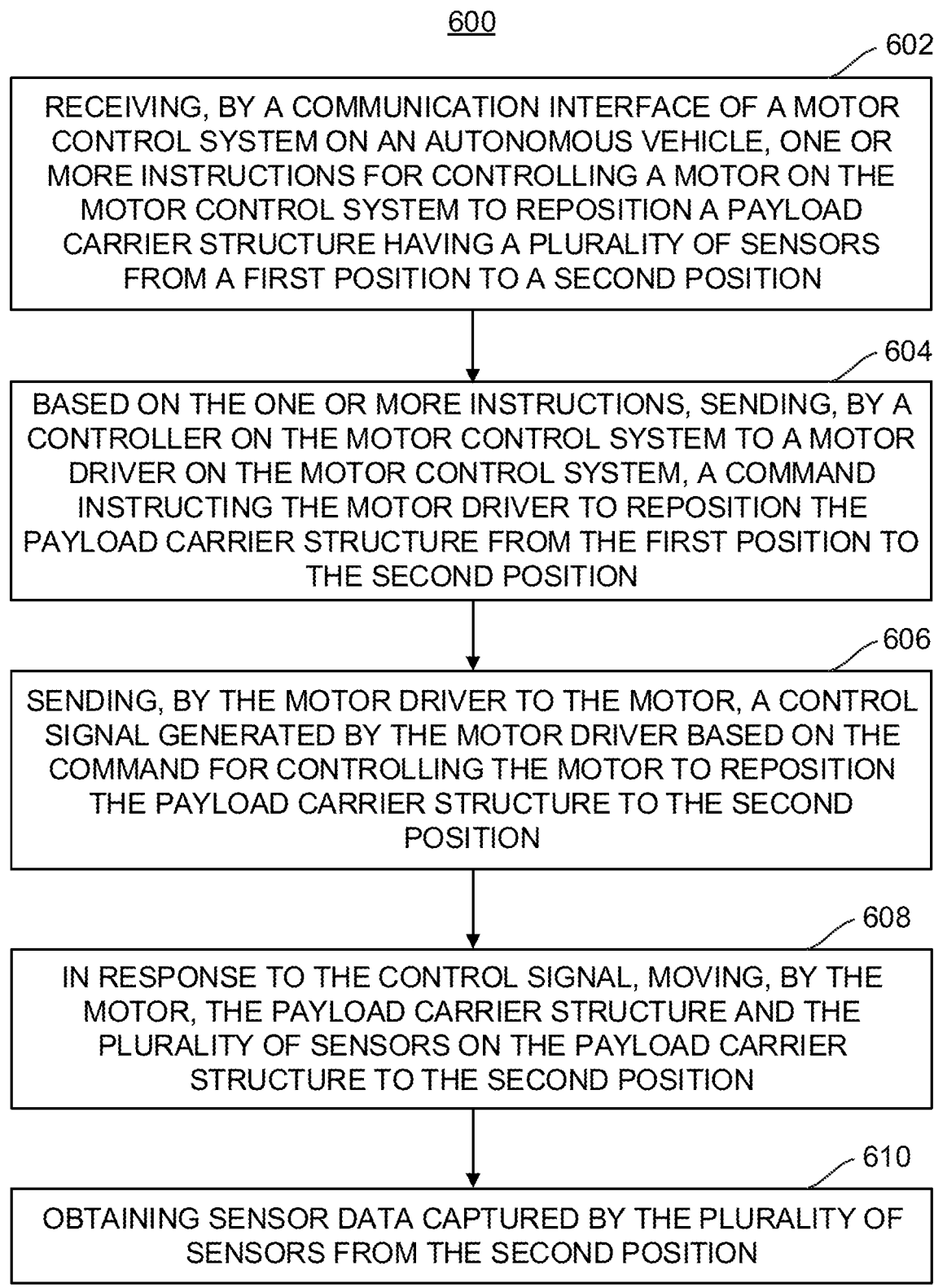
FIG. 6 illustrates an example method for implementing a sensor positioning platform on an autonomous vehicle.

Having disclosed some example system components and concepts, the disclosure now turns to FIG. 6, which illustrates an example method 600 for implementing a sensor positioning platform on an autonomous vehicle. For the sake of clarity, the method 600 is described in terms of the sensor positioning platform 200, as shown in FIG. 2, configured to practice the method. The steps outlined herein are exemplary and can be implemented in any combination thereof, including combinations that exclude, add, or modify certain steps.

At step 602, the method 600 can include receiving, by a communication interface (204) of a motor control system (202) on an autonomous vehicle (102), one or more instructions for controlling a motor (212) on the motor control system to reposition a payload carrier structure (220) having a plurality of sensors (e.g., 104, 106, 108) from a first position to a second position. The one or more instructions can originate from a remote computing system or network, such as an internal computing system (110) on the autonomous vehicle, a remote server, a remote computing device (e.g., 150), a cloud or cloud service, a mobile user device (e.g., a tablet computer, a laptop computer, a smartphone, etc.), or any other computing system or network.

The one or more instructions can specify the second position being requested for repositioning the payload carrier structure. Moreover, in some examples, the one or more instructions can include a request to move the motor (and consequently the payload carrier structure and the plurality of sensors) to the second position. In other examples, the one or more instructions can include a request to move the payload carrier structure and/or the plurality of sensors, either in addition or in lieu of a request to move the motor to the second position.

In some cases, if the autonomous vehicle has multiple sensor positioning platforms, the one or more instructions can include a request to move the respective motors, payload carrier structures, and/or pluralities of sensors on the multiple sensor positioning platforms to the second position. In other cases, if the autonomous vehicle has multiple sensor positioning platforms, the one or more instructions can include a request to move each respective motor, payload carrier structure, and/or plurality of sensors on each sensor positioning platform to a requested position. The requested position specified for a particular sensor positioning platform can be the same or different than the requested position specified for one or more of the other sensor positioning platforms.

The second position specified in the one or more instructions can be determined based on one or more factors associated with the autonomous vehicle and/or the surrounding or outside environment. Non-limiting examples of one or more factors that can be used to determine the second position can include a current, predicted or measured position of the autonomous vehicle; a trajectory (e.g., direction of travel) of the autonomous vehicle; a motion of the autonomous vehicle; a condition of the autonomous vehicle; a change in motion or position of the autonomous vehicle; a safety condition (e.g., road conditions, nearby objects, pedestrians, other vehicles, a safety hazard, etc.); navigation data; sensor data; a visibility or gap in visibility of the plurality of sensors; a location or position of a scene or area of interest; sensor or navigation feedback; an error in used or available data (e.g., sensor data, navigation data, data estimates, calculations or predictions, etc.), traffic conditions, detected activity (e.g., activity associated with the autonomous vehicle, other objects, humans, etc.), traffic rules, a current position of one or more components of the sensor positioning platform (e.g., the plurality of sensors, the motor, the payload carrier structure, etc.), and so forth.

In some examples, the second position can be determined based on motion dynamics calculated for the autonomous vehicle and a sensor coverage area of interest. The motion dynamics can include, for example and without limitation, a motion of the autonomous vehicle, a position or motion change of the autonomous vehicle, a velocity of the autonomous vehicle, a trajectory of the autonomous vehicle, an acceleration of the autonomous vehicle, a position of the autonomous vehicle, a location of the autonomous vehicle, etc.

At step 604, the method 600 can include based on the one or more instructions, sending, by a controller (206) on the motor control system to a motor driver (210) on the motor control system, a command instructing the motor driver to reposition the payload carrier structure (and/or the motor/sensors) from the first position to the second position. The controller can parse the one or more instructions received from the communication interface, generate the command, and send the command to the motor driver. In some cases, when generating the command, the controller can check the second position and make any corrections or adjustments.

For example, the controller can obtain, from a position sensor (214) on the motor control system, measurements of the current or actual position of the motor. The controller can then use the measurements to compare the current or actual position of the motor with the second position being requested and make any corrections or adjustments based on the comparison and/or an instantaneous error identified based on the comparison. In some implementations, the position sensor can include or implement a multi-pole magnetic strip for measuring a current or actual position of the motor. The multi-pole magnetic strip can be placed along an outside the motor, a rotor of the motor, a stator of the motor, or any other location suitable for measuring a position of the motor.

The position sensor can include any type of sensor, encoder, transducer, detector, transmitter, and/or sensing component capable of measuring the position (e.g., linear, angular, etc.) and/or change of position of the motor. For example and without limitation, the position sensor can include an optical encoder, a potentiometer, a magnetic position sensor (e.g., Hall effect sensor, magnetorestrictive position sensor, etc.), a rotary encoder, a linear encoder, a capacitive position sensor, an inductive position sensor (e.g., resolver, linearly variable differential transformer, etc.), a fiber-optic position sensor, a photodiode array, an incoder, and/or any other type of position (e.g., linear, angular, displacement, etc.) measurement device. Moreover, the position sensor can reside under the motor, along an outside of the motor, along an outside of a rotor of the motor, along an outside of a stator of the motor, and/or in any other location that allows the position sensor to obtain positioning measurements for the motor.

At step 606, the method 600 can include sending, by the motor driver to the motor, a control signal generated by the motor driver based on the command for controlling the motor to reposition the payload carrier structure to the second position. In some examples, to generate the control signal, the motor driver can translate the command from the controller into a format and power level that can move the motor to the second position. The motor driver can then send to the motor the control signal having the translated format and power level.

At step 608, the method 600 can include, in response to the control signal, moving, by the motor, the payload carrier structure and the plurality of sensors on the payload carrier structure to the second position. For example, the motor can use the control signal to apply an amount of force on the payload carrier structure for moving the payload carrier structure to the second position. Thus, the motor can rotate, move, or otherwise reposition the payload carrier structure to the second position based on the control signal.

In some cases, the motor can move the payload carrier structure to the second position during an operation of the autonomous vehicle. The operation of the autonomous vehicle can include, for example and without limitation, traveling at one or more velocities, performing a navigation maneuver, running a vehicle propulsion system (130) of the autonomous vehicle while the autonomous vehicle is stopped (e.g., waiting for a traffic signal, etc.) or moving, etc.

At step 610, the method 600 can include receiving sensor data captured by the plurality of sensors from the second position. For example, the plurality of sensors can collect measurements and sensor data from the second position and provide them to the motor control system, which can then report or send the data to a remote computing system, such as a cloud, an internal computing system on the autonomous vehicle, a remote server, a remote network, a remote computing system, and/or any other computing system or network. In some cases, the plurality of sensors can collect measurements and sensor data as they are moved from the first position to the second position in order to capture sensor data not only from the second position but also from one or more positions between the first position and the second position.

In some examples, the plurality of sensors can include one or more image sensors (e.g., a visible light image sensor or camera, an infrared image sensor or camera, a video camera, etc.), one or more radar sensors, one or more LIDARs, one or more inertial measurement units, one or more position sensors, one or more light-emitting sensors (e.g., structured light-emitting sensors, lasers, etc.), one or more GPS devices, and/or any other type of sensor. Moreover, the sensor data can include, for example and without limitation, image data (e.g., one or more images or image frames, one or more videos, etc.), radar returns, a thermal image, LIDAR laser returns, roll measurements, pitch measurements, yaw measurements, and/or any other type of sensor data.

In some aspects, the method 600 can include gathering sensor data via the plurality of sensors on the payload carrier structure as the payload carrier structure moves from the first position to the second position; moving, by the motor and during an operation of the autonomous vehicle, the payload carrier structure and the plurality of sensors on the payload carrier structure from the second position to a third position; and gathering sensor data via the plurality of sensors on the payload carrier structure as the payload carrier structure moves from the second position to the third position. In this example, the plurality of sensors on the payload carrier structure can thus gather measurements or sensor data from the first position, from one or more positions between the first position and the second position, from the second position, from one or more positions between the second position and the third position, and from the third position.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 7:
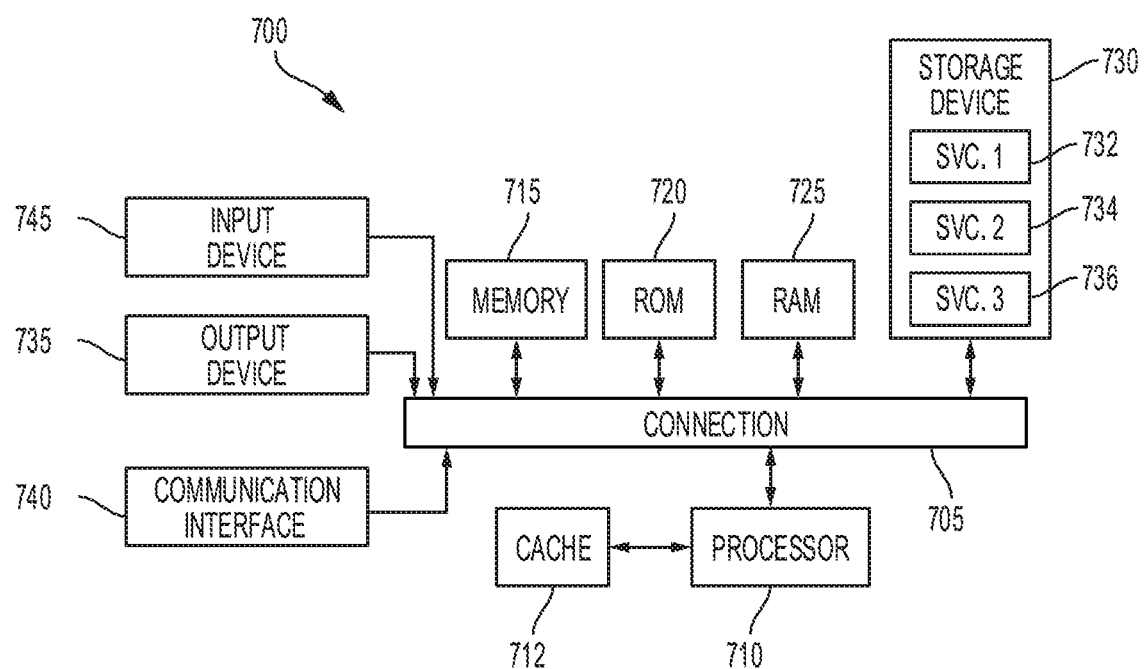
FIG. 7 illustrates an example computing system architecture for implementing various aspects of the present technology.

FIG. 7 illustrates an example computing system 700 which can be, for example, any computing device making up internal computing system 110, remote computing system 150, a passenger device executing rideshare application 170, or any other computing device. In FIG. 7, the components of the computing system 700 are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, by a communication interface of a motor control system on an autonomous vehicle, one or more instructions for controlling a motor on the motor control system to reposition a payload carrier structure associated with the motor control system from a first position to a second position, the payload carrier structure comprising a plurality of sensors;
   based on the one or more instructions, sending, by a controller on the motor control system to a motor driver on the motor control system, a command instructing the motor driver to reposition the payload carrier structure from the first position to the second position;
   sending, by the motor driver to the motor, a control signal generated by the motor driver based on the command, the control signal controlling the motor to reposition the payload carrier structure to the second position; and
   in response to the control signal, moving, by the motor, the payload carrier structure and the plurality of sensors on the payload carrier structure to the second position.

2. The method of claim 1, further comprising:
   translating, by the motor driver, the command from the controller into a format and power level configured to control the motor to reposition the payload carrier structure to the second position; and
   generating, by the motor driver, the control signal based on the format and power level configured to control the motor to reposition the payload carrier structure to the second position.

3. The method of claim 1, further comprising:
   receiving sensor data captured by the plurality of sensors from the second position, the sensor data identifying one or more characteristics of a current environment of the autonomous vehicle or one or more conditions associated with an operation of the autonomous vehicle, wherein the plurality of sensors comprises at least one of a visible light image sensor, an infrared image sensor, a radar sensor, a light detection and ranging (LIDAR) sensor, an inertial measurement unit, and a position sensor, and wherein the sensor data comprises at least one of image data, radar returns, a thermal image, LIDAR laser returns, and roll measurements, pitch measurements, and yaw measurements.

4. The method of claim 1, further comprising:
   determining, based on one or more measurements from a position sensor on the motor control system, that the motor is at the first position;
   calculating, by the controller, a difference between the first position and the second position; and
   based on the difference between the first position and the second position, generating the command instructing the motor driver to reposition the payload carrier structure from the first position to the second position.

5. The method of claim 4, wherein the position sensor comprises a multi-pole magnetic strip for measuring a current position of the motor, the multi-pole magnetic strip being placed along an outside of at least one of the motor, a rotor of the motor, and a stator of the motor.

6. The method of claim 1, wherein the second position is determined based on motion dynamics calculated for the autonomous vehicle and a sensor coverage area of interest, the motion dynamics comprising at least one of a motion of the autonomous vehicle, a position change of the autonomous vehicle, a velocity of the autonomous vehicle, a trajectory of the autonomous vehicle, an acceleration of the autonomous vehicle, and a position of the autonomous vehicle.

7. The method of claim 1, wherein the motor moves the payload carrier structure and the plurality of sensors on the payload carrier structure from the first position to the second position during an operation of the autonomous vehicle, the method further comprising:
   as the payload carrier structure moves from the first position to the second position, gathering sensor data via the plurality of sensors on the payload carrier structure;
   moving, by the motor and during the operation of the autonomous vehicle, the payload carrier structure and the plurality of sensors on the payload carrier structure from the second position to a third position; and
   as the payload carrier structure moves from the second position to the third position, gathering sensor data via the plurality of sensors on the payload carrier structure.

8. The method of claim 7, wherein the operation of the autonomous vehicle comprises traveling at one or more velocities, wherein the motor control system is contained within a cylindrical form factor assembly, and wherein the payload carrier structure comprises an azimuth positioning stage, the plurality of sensors being co-located on the azimuth positioning stage.

9. An autonomous vehicle comprising:
   a mechanical system;
   a motor control system in communication with the mechanical system, wherein the motor control system comprises:
   a motor;
   a motor driver;
   one or more processors; and
   memory comprising instructions that, when executed by the one or more processors, cause the motor control system to:
   receive one or more instructions for controlling the motor to reposition a payload carrier structure associated with the motor control system from a first position to a second position, the payload carrier structure comprising a plurality of sensors;
based on the one or more instructions, send, to the motor driver, a command instructing the motor driver to reposition the payload carrier structure from the first position to the second position;
send, via the motor driver to the motor, a control signal generated by the motor driver based on the command, the control signal controlling the motor to reposition the payload carrier structure to the second position; and
in response to the control signal, move, via the motor, the payload carrier structure and the plurality of sensors on the payload carrier structure to the second position.

10. The autonomous vehicle of claim 9, wherein the memory comprises additional instructions which, when executed by the one or more processors, cause the motor control system to:
receive sensor data captured by the plurality of sensors from the second position, the sensor data identifying one or more characteristics of a current environment of the autonomous vehicle or one or more conditions associated with an operation of the autonomous vehicle.

11. The autonomous vehicle of claim 10, wherein the plurality of sensors comprises at least one of a visible light image sensor, an infrared image sensor, a radar sensor, a light detection and ranging (LIDAR) sensor, an inertial measurement unit, and a position sensor, and wherein the sensor data comprises at least one of image data, radar returns, a thermal image, LIDAR laser returns, and roll, pitch, and yaw measurements.

12. The autonomous vehicle of claim 9, wherein the memory comprises additional instructions which, when executed by the one or more processors, cause the motor control system to:
translate, via the motor driver, the command into a format and power level configured to control the motor to reposition the payload carrier structure to the second position; and
generate, via the motor driver, the control signal based on the format and power level configured to control the motor to reposition the payload carrier structure to the second position.

13. The autonomous vehicle of claim 9, wherein the memory comprises additional instructions which, when executed by the one or more processors, cause the motor control system to:
determine, based on one or more measurements from a position sensor on the motor control system, that the motor is at the first position;
calculate a difference between the first position and the second position; and
based on the difference between the first position and the second position, generate the command instructing the motor driver to reposition the payload carrier structure from the first position to the second position.

14. The autonomous vehicle of claim 13, wherein the position sensor comprises a multi-pole magnetic strip for measuring a current position of the motor, the multi-pole magnetic strip being placed along an outside of at least one of the motor, a rotor of the motor, and a stator of the motor, wherein the motor control system is contained within a cylindrical form factor assembly, and wherein the payload carrier structure comprises an azimuth positioning stage, the plurality of sensors being co-located on the azimuth positioning stage.

15. The autonomous vehicle of claim 9, wherein the motor moves the payload carrier structure and the plurality of sensors on the payload carrier structure from the first position to the second position during an operation of the autonomous vehicle, wherein the memory comprises additional instructions which, when executed by the one or more processors, cause the motor control system to:
gather, as the payload carrier structure moves from the first position to the second position, sensor data via the plurality of sensors on the payload carrier structure;
move, via the motor and during the operation of the autonomous vehicle, the payload carrier structure and the plurality of sensors on the payload carrier structure from the second position to a third position; and
gather, as the payload carrier structure moves from the second position to the third position, sensor data via the plurality of sensors on the payload carrier structure.

16. The autonomous vehicle of claim 15, wherein the operation of the autonomous vehicle comprises traveling at one or more velocities, wherein the second position is determined based on motion dynamics calculated for the autonomous vehicle and a sensor coverage area of interest, the motion dynamics comprising at least one of a motion of the autonomous vehicle, a position change of the autonomous vehicle, a velocity of the autonomous vehicle, a trajectory of the autonomous vehicle, an acceleration of the autonomous vehicle, and a position of the autonomous vehicle.

17. A system comprising:
a motor;
a motor driver;
one or more processors; and
memory comprising instructions that, when executed by the one or more processors, cause the system to:
receive one or more instructions for controlling the motor to reposition a payload carrier structure associated with the system from a first position to a second position, the payload carrier structure comprising a plurality of sensors;
based on the one or more instructions, send, to the motor driver, one or more commands instructing the motor driver to reposition the payload carrier structure from the first position to the second position;
send, via the motor driver to the motor, one or more control signals generated by the motor driver based on the one or more commands, the one or more control signals controlling the motor to reposition the payload carrier structure to the second position; and
move, via the motor, the payload carrier structure and the plurality of sensors on the payload carrier structure to the second position.

18. The system of claim 17, wherein the motor moves the payload carrier structure and the plurality of sensors on the payload carrier structure from the first position to the second position during an operation of the autonomous vehicle, wherein the memory comprises additional instructions which, when executed by the one or more processors, cause the system to:
as the payload carrier structure moves from the first position to the second position, gather sensor data via the plurality of sensors on the payload carrier structure;
move, via the motor and during the operation of the autonomous vehicle, the payload carrier structure and the plurality of sensors on the payload carrier structure from the second position to a third position; and as the payload carrier structure moves from the second position to the third position, gather sensor data via the plurality of sensors on the payload carrier structure.

19. The system of claim 17, wherein the memory comprises additional instructions which, when executed by the one or more processors, cause the system to:

translate, via the motor driver, the one or more commands into a format and power level configured to control the motor to reposition the payload carrier structure to the second position; and generate, via the motor driver, the one or more control signals based on the format and power level configured to control the motor to reposition the payload carrier structure to the second position.

20. The system of claim 17, wherein the memory comprises additional instructions which, when executed by the one or more processors, cause the system to:

determine, based on one or more measurements from a position sensor on the motor control system, that the motor is at the first position;

calculate a difference between the first position and the second position; and based on the difference between the first position and the second position, generate the one or more commands instructing the motor driver to reposition the payload carrier structure from the first position to the second position.

* * * * *

UNITED STATES PATENT AND TRADEMARK OFFICE
CERTIFICATE OF CORRECTION

| | |
|---|---|
| PATENT NO. | : 11,150,644 B2 |
| APPLICATION NO. | : 16/425348 |
| DATED | : October 19, 2021 |
| INVENTOR(S) | : Yung Ko et al. |

It is certified that error appears in the above-identified patent and that said Letters Patent is hereby corrected as shown below:

On the Title Page

Item (72), correct the name of the first inventor from "Yung Change Ko" to --Yung Chang Ko--

Signed and Sealed this
Twenty-first Day of February, 2023

Katherine Kelly Vidal
*Director of the United States Patent and Trademark Office*